No Printed Specification Available
6320X
Townsend & Durfee.
Machine for Making Rope.
Patented Jan. 6, 1831.
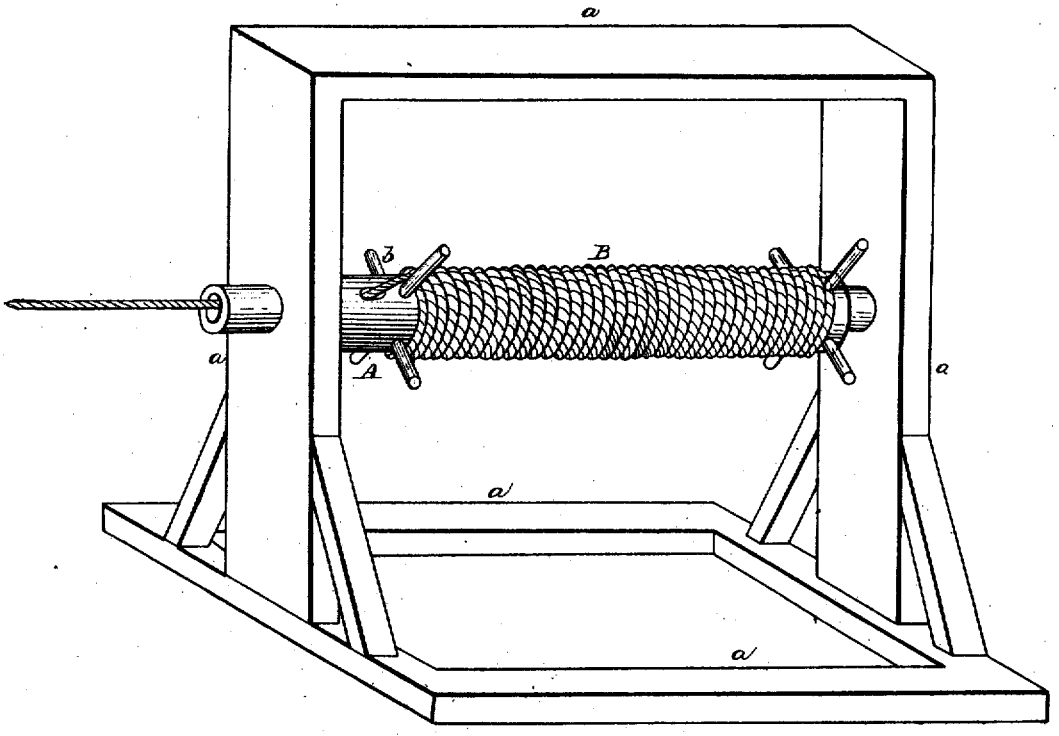

1/6/1831 6320X

Jan 6 1831 [illegible]

Edward J Townsend & Phil Draper
Letters Patent

The schedule referred to in these Letters Patent and making part
of the same containing a description in the words of the said Ed
-ward J Townsend and Phil Draper themselves of their impro
-vement in the manufacturing of Rope.

This Machine is composed of a Shaft or reel used in place of a
wheel or crank to give the twist or turn for laying Strands or rope
so that a Strand or rope can be twisted or laid in certain lengths
at a time until a rope or Strand is twisted or laid of any
required length. The Shaft to be fixed to revolve on proper sup
-ports in boxes or gudgeons made of proper materials with a
hole passing into the side and out at the end so that when a rope
or Strand is coiled on the Shaft the end of it can pass through the
eye thus made in the end of the Shaft not interfering with its
supports thus giving a chance for Spinning to it another length
of yarn - then the Shaft being turned gives the twist for the lay
ing of Strands or rope, which when so laid is again to be reeled
leaving the rope out as before thus on laying and Spinning until
any required length is finished The Chief object is to make a
rope of any assignable length in one piece by laying it in portions
of convenient length and Spinning into the threads of the end of such
part as is already laid In laying several ropes into larger, or laid
yarns into a rope the number Machines must be equal to the num
-ber of Strands and rope and may remain stationary or be placed
on Slides or truck wheels, as may be necessary Witnesses Charles Draper
Walton Cobb Edward J Townsend
Phil Draper

[illegible]

350 [illegible]